(12) United States Patent
Xu et al.

(10) Patent No.: US 7,567,569 B2
(45) Date of Patent: *Jul. 28, 2009

(54) METHOD FOR RECURSIVE BGP ROUTE UPDATES IN MPLS NETWORKS

(75) Inventors: Milton Y. Xu, San Jose, CA (US); Liqin Dong, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 523 days.

This patent is subject to a terminal disclaimer.

(21) Appl. No.: 11/231,715

(22) Filed: Sep. 21, 2005

(65) Prior Publication Data

US 2006/0013232 A1 Jan. 19, 2006

Related U.S. Application Data

(63) Continuation of application No. 10/404,494, filed on Apr. 1, 2003, now Pat. No. 6,970,464.

(51) Int. Cl.
*H04L 12/56* (2006.01)
*H04L 12/28* (2006.01)
*G06F 9/26* (2006.01)

(52) U.S. Cl. .................. 370/392; 370/397; 370/399; 370/395.31; 370/409; 711/220; 711/221

(58) Field of Classification Search ......... 370/389–392; 711/216–221
See application file for complete search history.

(56) References Cited

U.S. PATENT DOCUMENTS

| 6,205,488 | B1 | 3/2001 | Casey et al. .................. 709/238 |
| 6,339,595 | B1 | 1/2002 | Rekhter et al. |
| 6,374,303 | B1 | 4/2002 | Armitage et al. ............. 709/242 |
| 7,277,426 | B2 * | 10/2007 | Brown ......................... 370/383 |
| 2003/0048792 | A1 * | 3/2003 | Xu et al. ...................... 370/400 |
| 2003/0112799 | A1 | 6/2003 | Chandra et al. ............. 370/389 |
| 2004/0008675 | A1 | 1/2004 | Basso et al. ................. 370/389 |
| 2004/0013120 | A1 | 1/2004 | Shen ..................... 370/395.31 |
| 2004/0044786 | A1 * | 3/2004 | Basso et al. ................. 709/238 |
| 2004/0177157 | A1 | 9/2004 | Mistry et al. ................ 709/241 |
| 2004/0202171 | A1 * | 10/2004 | Hama ...................... 370/395.1 |

FOREIGN PATENT DOCUMENTS

EP    1 100 233 A    5/2001

OTHER PUBLICATIONS

"Framework for IP Multicast in MPLS", D. Ooms et al., Internet Draft, Network Working Group, Apr. 2002.
Grenville Armitage et al:"MPLS:The Magic Behind the Myths" IEEE Communications Magazine,IEEE Service Center,Piscataway,US,vol. 38, No. 1, Jan. 1, 2000, pp. 124-131.
Rosen E Rekhter Y: "BGP/MPLS VPNs" Network Working Group Request for Comments, Mar. 1, 1999, pp. 1-24, XP002959287.
CISCO: "Designing MPLS Extension for Customer Edge Router" CISCO Systems Product Bulletin, pp. 1-23, XP002994706.

* cited by examiner

*Primary Examiner*—Daniel J Ryman
*Assistant Examiner*—Thinh D. Tran
(74) *Attorney, Agent, or Firm*—Cindy Kaplan (57) ABSTRACT

A method for providing BGP route updates in an MPLS network is disclosed. The route update is performed at a router having a forwarding information table containing BGP routes and an internal label, and an adjacency table containing BGP/VPN labels and said internal label. The internal label corresponds to at least one IGP route and has an adjacency associated therewith. The method includes updating the adjacency associated with the internal label following an IGP route change.

10 Claims, 6 Drawing Sheets

METHOD FOR RECURSIVE BGP ROUTE UPDATES IN MPLS NETWORKS

RELATED APPLICATION

This patent application is a continuation of U.S. patent application Ser. No. 10/404,494, filed Apr. 1, 2003, which is incorporated herein by reference in its entirety.

BACKGROUND OF THE INVENTION

The present invention relates generally to communication networks, and more specifically, to a method and system for handling recursive BGP (Border Gateway Protocol) route updates in MPLS (MultiProtocol Label Switching) networks.

The rapid growth of the Internet and the widespread deployment of networks built around the Internet Protocol suite are creating a demand for new capabilities in IP (Internet Protocol) networks. MPLS provides a number of powerful capabilities such as traffic engineering, etc. As with IP routers, MPLS nodes use a routing protocol such as OSPF or IS-IS to calculate network paths and establish reachability. Multiprotocol Label Switching is an IETF initiative that integrates Layer 2 information about network links (bandwidth, latency, utilization) into Layer 3 (IP) within a particular autonomous system in order to simplify and improve IP packet exchange. MPLS provides network operators a great deal of flexibility to divert and route traffic around link failures, congestion, and bottlenecks. MPLS based networks are becoming increasingly important for today's backbone Internet.

In MPLS, data transmission occurs on label-switched paths (LSPs). LSPs are a sequence of labels at each and every node along the path from the source to the destination. LSPs are established prior to data transmission (control-driven). The labels, which are underlying protocol-specific identifiers, are distributed using label distribution protocol (LDP) or RSVP or multiprotocol border gateway protocol (MPBGP). Each data packet encapsulates and carries the labels during their journey from source to destination. High-speed switching of data is possible because the fixed-length labels are inserted at the very beginning of the packet or cell and can be used by hardware to switch packets quickly between links.

With MPLS, incoming packets (predominantly IP packets) are assigned with a label when the packets enter the MPLS network. Packet forwarding is done based on label information within the MPLS core network. In today's routers, packets are typically forwarded with the assistance of ASIC hardware. After an IP packet enters a router, the router decides the next hop or path the packet needs to go by looking up the routing table, typically using the destination address of the IP packet.

MPLS enabled networks are becoming increasingly important for today's service providers (SPs) in the design and deployment of current and future networks. A primary contributing factor is that MPLS, as an enabling technology, has the capability of converging not only voice, data, and video, but also frame, cell, and packet networks into a single network. Deploying and managing a single and scaleable network is a great benefit to service providers. Furthermore, MPLS networks also allow service providers to do traffic engineering, and quickly reroute customer traffic upon identification of a link failure within their network. This is an important feature for carrier class networks.

One of the key advantages that MPLS provides is that the vast amount of BGP routes that must be available in every router in the SP network is only needed at the provider edge router (PE). This is accomplished by the combination of BGP (MP-BGP for MPLS/VPN) and LDP (Label Distribution Protocol) running in the core. BGP is a routing protocol that can be used to exchange routing information between different or same autonomous systems. Customer networks usually use an Interior Gateway Protocol (IGP) such as RIP or OSPF for the exchange of routing information within their networks. Customers connect to ISPs and ISPs use BGP to exchange customer and ISP routes. BGP neighbors exchange full routing information when the TCP connection between neighbors is first established. When changes to the routing table are detected, the BGP routers send to their neighbors only those routes that have changed. BGP routers do not send periodic routing updates, and BGP routing updates advertise only the optimal path to a destination network.

Routers which have been configured to serve the SP network must be capable of switching data traffic at very high rates and processing a large amount of routing information very efficiently. Routers are often expected to recover from a link failure in a very short period of time (e.g., 50 msec) in order to serve the carrier network space. Fast ReRoute is one application of MPLS Traffic Engineering which enables customers to set up a backup network path with certain bandwidth requirements and explicitly route traffic down that path in the event of an interface or link failure.

Currently, high speed data switching is typically accomplished with the assistance of ASIC based switching engines. When an IP packet enters the PE router, the switching engine looks up its routing table, which may contain several hundred thousand routes. For MPLS/VPN case, the switching engine then pushes two labels (a top label and a bottom label) on top of the IP packet. The top label is an IGP (Interior Gateway Protocol) label for routing the packet across the network core. The bottom label is a VPN label for routing the packet to its final destination when it enters an egress PE router.

When a customer's IP packet enters the ingress PE of a SP's MPLS/VPN network, the PE's forwarding engine needs to lookup its routing table (using the packet's IP destination address). If there is a match, the packet will carry two labels when it leaves the ingress PE and enters the MPLS core network. Forwarding in ASIC for this scenario typically involves a hardware assisted lookup using the packet's IP destination address. If there is a match, the lookup result provides the forwarding engine with the location of a hardware adjacency entry, where the two labels and outgoing interface information are stored, to rewrite the packets with the correct label information before sending out the packet.

While traversing the core network to reach its final destination, the packet's IP destination address is no longer used. Instead the top (IGP) label is used to transmit the packet to the egress PE and the bottom (BGP/VPN) label is used for the egress PE to get to the final destination within the customer network. For example, if there are 500,000 different BGP/VPN routes, there will be 500,000 different BGP/VPN labels while there are only a few routes (if load sharing paths are considered) for the ingress PE to get the customer packets to the egress PE.

Figure 1:
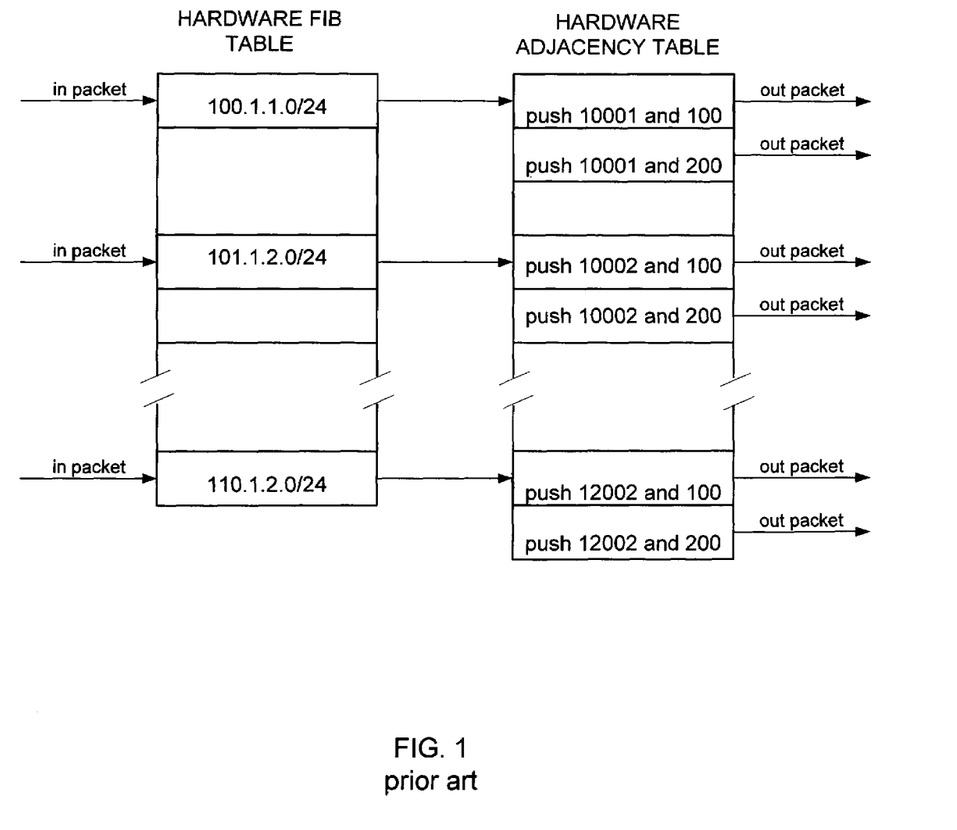
FIG. 1 is a diagram illustrating a prior art packet forwarding scheme.

The conventional approach for the ingress PE to forward the packet is as follows. Each of the customer routes (BGP/VPN) is programmed in its ASIC FIB (Forwarding Information Base) table. Each route is then associated with an ASIC adjacency entry, where the IGP label, BGP/VPN label, and source/destination MAC are rewritten to the outgoing packet. Their relationship and dependency are summarized in FIG. 1. Prefixes 100.1.1.0/24, 101.1.2.0/24, etc. are BGP routes. There are typically several hundred thousand routes. Labels 10001 and 10002 are BGP/VPN labels. Labels 100 and 200 are IGP labels. In this example, there are two loadsharing paths for each BGP route, represented by label 100 and 200, respectively.

The conventional approach described above works well for switching packets very fast, even when a large size routing table is present. However, it does not scale when the link between the PE and one of its immediate provider routers fails. This is because it takes a considerable amount of time to reprogram the ASIC switching engine to use a new IGP label to get to an alternative provider router for each of the BGP routes in it its routing table. The size of the BGP table may contain as many as several hundred thousand routes. Thus, latency in updating the ASIC forwarding engine will typically result in a long disruption of customer traffic.

There is, therefore, a need for a scaleable scheme for a forwarding engine to handle, for example, when a link between a provider edge router and its neighboring provider routers goes down or up and only the IGP routes for the network core (typically a small number of the BGP routes) need to be reprogrammed in the forwarding engine.

SUMMARY OF THE INVENTION

A method for forwarding packets in an MPLS network is disclosed. The method generally comprises receiving a packet at a router and inserting a BGP/VPN label and an internal label which identifies an IGP route. The method further includes creating an entry in a forwarding information table and creating at least one adjacency associated with the internal label in an adjacency table. The packet is recirculated with the BGP/VPN label and internal label. A lookup is then performed using the internal label and the internal label is replaced with an IGP label. The packet is then sent out from the router.

A method for providing BGP route updates in an MPLS network is also disclosed. The route update is performed at a router having a forwarding information table containing BGP routes and an internal label, and an adjacency table containing BGP/VPN labels and the internal label. The internal label corresponds to at least one IGP route and has an adjacency associated therewith. The method includes updating the adjacency associated with the internal label following an IGP route change.

In another aspect of the invention, a system for forwarding packets in an MPLS network is configured to reduce route updates. The system generally comprises a forwarding engine having a forwarding information table containing BGP routes and an internal label, and an adjacency table containing BGP/VPN labels and the internal label. The internal label corresponds to at least one IGP route and has an adjacency associated therewith. The forwarding engine is configured to insert a BGP/VPN label and the internal label to incoming packets, recirculate packets containing the BGP and internal labels, perform a lookup using the internal label, replace the internal label with an IGP label, and send out the packet.

The above is a brief description of advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers and switches. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, a hardware assisted forwarding engine, and a bus (e.g., a PCI bus). The CPU preferably includes a memory and a processor. When acting under the control of appropriate software or firmware, the CPU is responsible for such router tasks as routing table computations, network management, and processing of protocol packets. It preferably accomplishes all these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling operations of the router. Memory can be non-volatile RAM and/or ROM. However, there are many different ways in which memory could be coupled to the system. In an alternative embodiment, a router or switch may be implemented on a general purpose network host machine such as a computer system.

The present invention provides a scaleable method and system for hardware recursive BGP route updates in MPLS networks. As previously discussed, with the conventional approach if there is any change in IGP path (e.g., a path change due to FRR or path number change for load sharing paths) the number of hardware adjacency entries for all of the BGP/VPN routes affected need to be updated. In some cases, the number of BGP routes in the PE may be a half million or higher. In this case, the conventional approach would require a large amount of time to update all of the adjacency entries for these routes, resulting in serious customer traffic disruption. As described in detail below, the present invention maps a large amount of BGP routes to a few internal labels so that forwarding entries for BGP routes do not need to be changed when an IGP route change occurs. Thus reducing the time required to perform BGP route updates.

Figure 2:
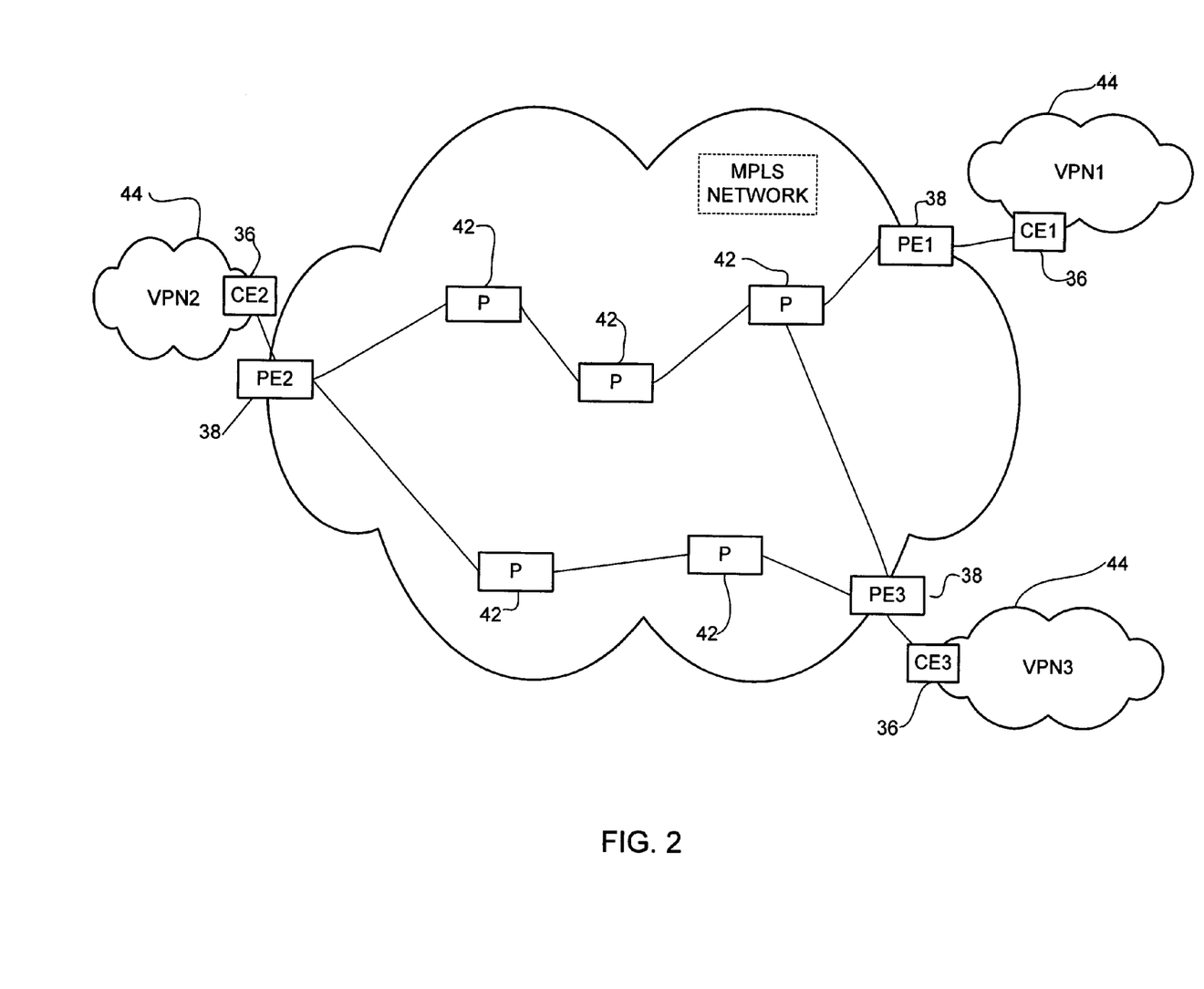
FIG. 2 is a network diagram illustrating an exemplary MPLS/VPN network topology.

Referring to FIG. 2, a network that may use a system and method of the present invention is shown. The network includes three customer edge routers (CE1, CE2, CE3) 36, three associated provider edge routers (PE1, PE2, PE3) 38, and five provider routers (P) 42. Each CE 36 is associated with a VPN (VPN1, VPN2, VPN3) 44. In MPLS, data transmission occurs on label-switched paths (LSPs). LSPs are a sequence of labels at each and every node along the path from the source to the destination. Fixed-length labels are inserted at the very beginning of the packet or cell and can be used by hardware to switch packets quickly between links. The routers may be, for example, an edge router 38 or a label switching router (LSR). The LSRs participate in the establishment of LSPs using the appropriate label signaling protocol and high-speed switching of the data traffic based on the established paths. Edge routers 38 operate at the edge of the access network and MPLS network and support multiple ports connected to dissimilar networks (such as frame relay, ATM, and Ethernet) and forwards this traffic on to the MPLS network after establishing LSPs, using the label signaling protocol at the ingress and distributing the traffic back to the access networks at the egress. A label identifies the path a packet should traverse and is carried or encapsulated in a Layer-2 header along with the packet. The receiving router examines the packet for its label content to determine the next hop. Once a packet has been labeled, the travel of the packet through the network backbone is based on label switching.

It is to be understood that FIG. 2 is only one example illustrating MPLS/VPN network technology and that other types of networks may be used without departing from the scope of the invention. For example, instead of a MPLS/VPN route, a pure BGP route may be implemented using this scheme to achieve high scalability during IGP route change. In this case, there is no VPN label. As described in detail below, the present invention provides a highly scaleable scheme for hardware recursive BGP route updates in MPLS networks.

Figure 4:
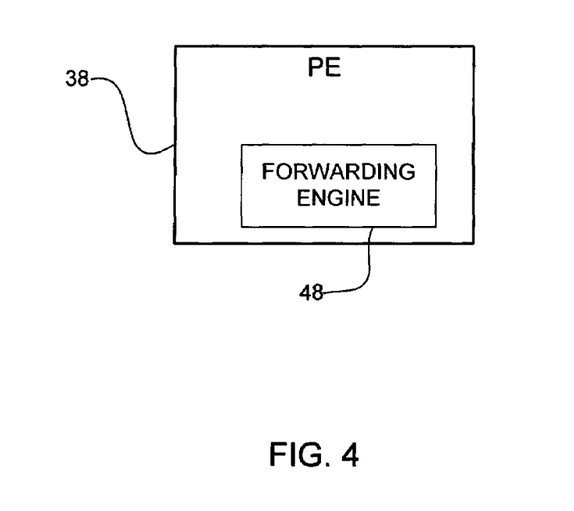
FIG. 4 is a block diagram illustrating a hardware forwarding engine of one of the routers of FIG. 2.

The invention described herein may be implemented in dedicated hardware. The following describes a hardware implementation utilizing a ASIC based forwarding engine 48 (FIG. 4).

Figure 3:
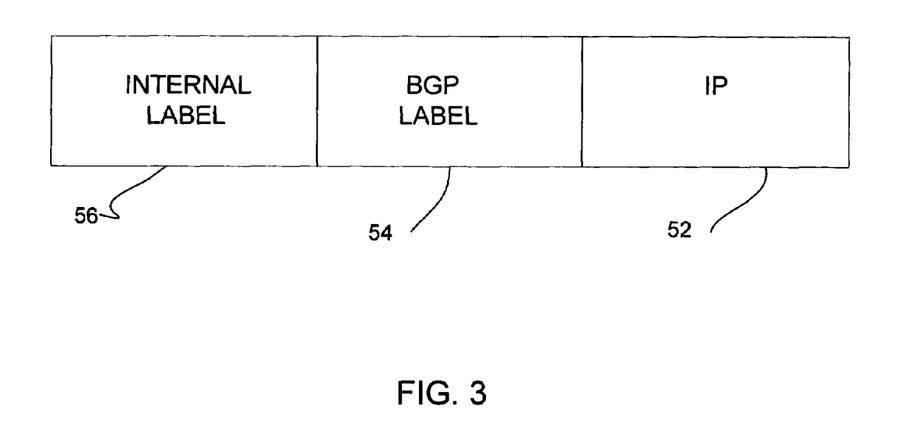
FIG. 3 is a diagram illustrating labels of an IP packet encapsulated with VPN label and internal label.

Hardware forwarding engine 48 uses hardware to forward data packets to achieve high performance. The hardware routing table and adjacency table are programmed with the assistance of software prior to data transmission. When data packets arrive, the hardware forwarding engine 48 looks up the hardware routing table, finds the route entry and adjacency to route the packet and forward the packets accordingly. An IP path for a given route within a router is typically represented by the router's next hop IP address, which is a four-byte value. An MPLS path for a given route is typically represented by an encapsulated byte string, which contains the destination and source MAC addresses and the variable sized MPLS label stack. When an IP packet enters one of the PE routers 38, the forwarding engine 48 looks up its routing table. The forwarding engine 48 then pushes two labels on top of the IP packet 52, as shown in FIG. 3. The top label is a fixed internal label 56 (which replaces the prior art IGP labels) and identifies an IGP route. The bottom label is a BGP/VPN label 54 used for routing the packet to its final destination when it enters the egress PE router 38.

Figure 5:
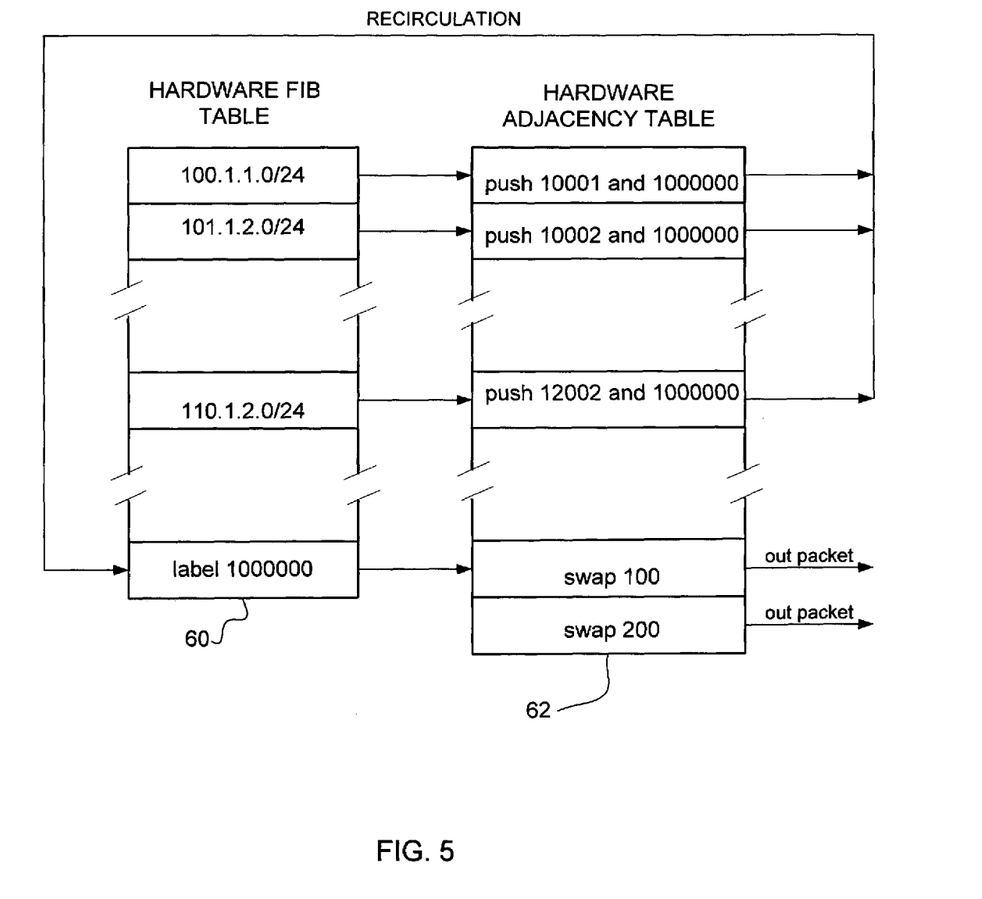
FIG. 5 is a diagram illustrating a packet forwarding scheme of the present invention.

FIG. 5 illustrates a FIB (Forwarding Information Base) table 60, an adjacency table 62, and a route and adjacency relationship for one embodiment of the forwarding scheme of the present invention. Each of the customer routes (BGP/VPN) is programmed in its FIB table. Each route is then associated with an adjacency entry. Prefixes 100.1.1.0/24, 101.1.2.0/24, and 110.1.2.0/24 are BGP routes. As described above, there may be several hundred thousands of such routes. Labels 10001, 10002, and 12002 are BGP/VPN labels. In the present scheme, conventional IGP labels (100 and 200) (FIG. 1) are replaced with a fixed internal MPLS label 1000000 in each hardware adjacency entry for BGP routes. The internal label is not given to PE's MPLS neighbors for use in normal forwarding purposes.

In the hardware FIB table, a single entry having the internal label as the lookup key is created. Another hardware adjacency (or multiple adjacency entries for loadsharing paths) is created where the IGP label and MAC information of the PE's neighboring provider router are stored. This hardware adjacency is associated with the internal label based hardware FIB entry.

Each hardware adjacency of a BGP route tells the forwarding engine 48 to push the BGP/VPN label plus the internal label and then recirculate the packet (FIGS. 2 and 5). This takes place instead of having the adjacency instruct the forwarding engine 48 to forward the packet out of the PE router (as shown in the conventional forwarding scheme of FIG. 1). Packet recirculation can be completed at very high speed with ASIC assistance.

The packet is now labeled with the internal label sitting on top and the BGP/VPN label in the bottom of the label stack (FIGS. 3 and 5). The labeled packet re-enters the forwarding engine 48 after recirculation and packet lookup matches the internal label. The forwarding engine 48 then uses its adjacency entry to swap the internal label with the IGP label and send out the packet.

When an IGP route change occurs, only the hardware adjacency associated with the internal label needs to be updated while BGP routes and their corresponding hardware adjacency entries remain the same. Updating a single entry versus hundred thousands of entries becomes very scaleable and as such, SP stringent requirements to restore all network traffic in a fraction of seconds can be met. Thus, each hardware adjacency for BGP routes takes only one hardware adjacency entry even if loadsharing paths are considered. Hardware adjacency for internal label can take multiple hardware adjacency entries.

Figure 6:
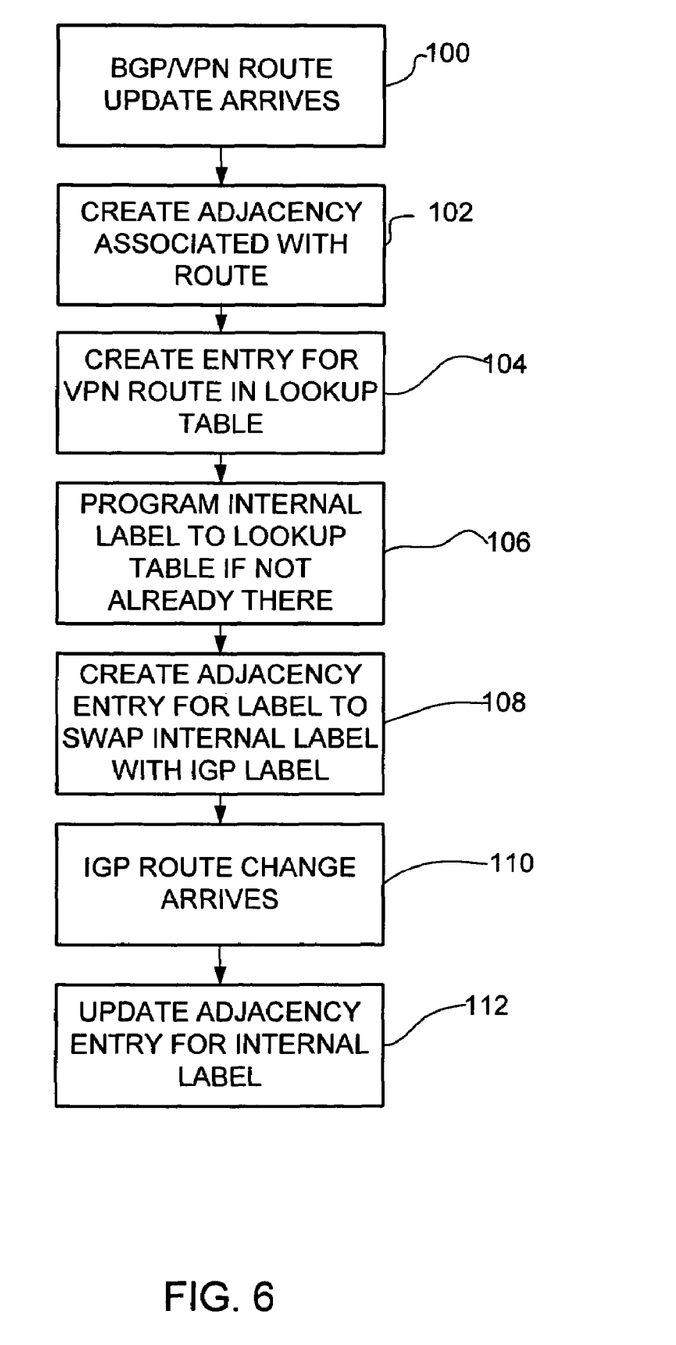
FIG. 6 is a flowchart illustrating a method for performing route updates in an MPLS network.

FIG. 6 is a flowchart illustrating the above described process for route updates in an MPLS network. At step 100, a BGP/VPN route update arrives. A hardware adjacency associated with this route is created (step 102). The adjacency contains one VPN label and one internal label. Next, an entry for the VPN route in the hardware lookup table is created (step 104). This entry points to the adjacency created at step 102. The internal label is programmed to the hardware lookup table if it is not already there (step 106). Also, an adjacency entry is created for this label to swap the internal label with the IGP label (step 108). The IGP route change arrives at step 110. The adjacency entry is then updated for the internal label (step 112).

Figure 7:
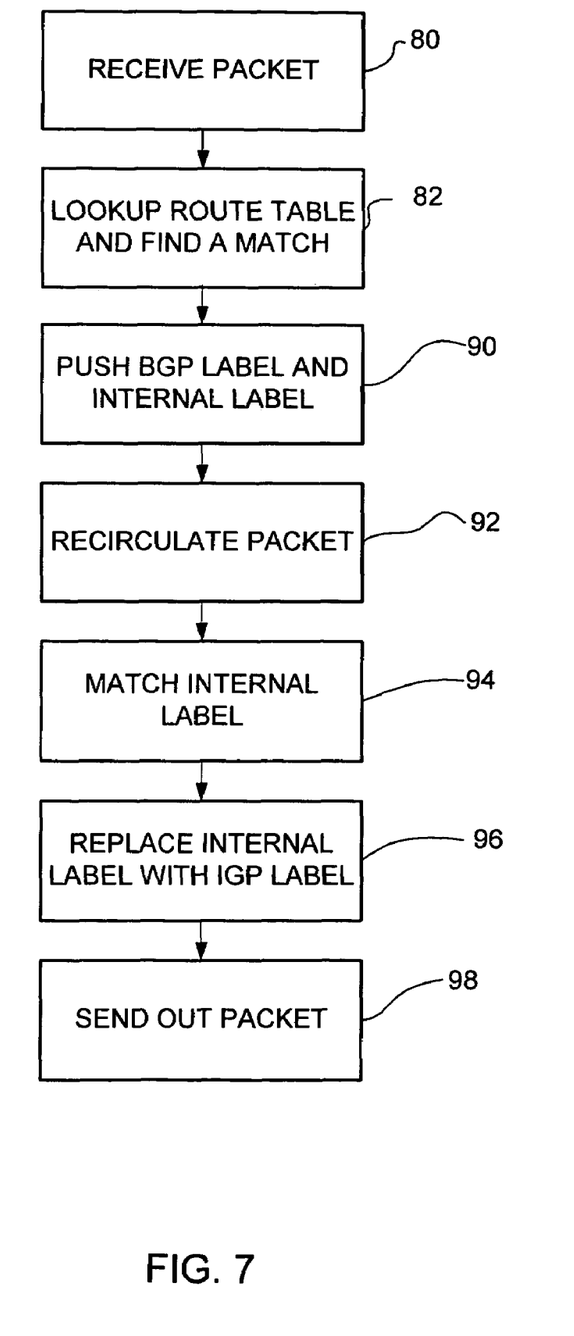
FIG. 7 is a flowchart illustrating data packet flow while the packet is being switched at the PE router.

FIG. 7 is a process flowchart illustrating data packet flow while the packet is being switched at one of the PE routers 38.

A customer's IP packet enters an ingress PE of a SP's MPLS/VPN network at step 80. The PE's forwarding engine looks up its routing table and finds a match (step 82). Each adjacency of a BGP route then instructs the forwarding engine to push BGP/VPN label and internal label (step 90) and recirculate the packet (step 92). Packet lookup then matches the internal label (step 94). The forwarding engine uses its adjacency entry to swap the internal label with IGP label (step 96) and sends the packet out (step 98).

It is to be understood that although the above example described how BGP recursive routes for IP to MPLS paths can be handled in a highly scaleable manner, this scheme is also applicable to MPLS to MPLS paths (e.g., as is the case at a carrier's carrier PE), where the interface between PE and CE is MPLS enabled.

As can be observed from the foregoing, the above described invention provides increased network reliability, availability, and high scalability in MPLS networks. For example, increased reliability, availability and much shorter down time is obtained in the case of link failures, as only hardware adjacency entries for IGP routes need to be updated in the case of IGP route changes. As compared to conventional schemes, which require updates to adjacency entries of all BGP routes, the invention described herein greatly reduces the time required to update the hardware forwarding table. The network traffic is thus disrupted for a small amount of time. This low latency advantage is important in time critical applications such as Fast Reroute.

Furthermore, the above described invention provides high scalability since it maps large amounts of BGP routes to a few internal labels which correspond to the IGP routes so that hardware forwarding entries for BGP routes are intact during IGP route change. This makes the hardware table update time independent of the number of BGP routes in the device, thus, providing a high degree of scalability.

The invention further provides hardware resource savings in loadsharing cases. In a router where there are multiple paths to its BGP neighbor (a common scenario in SP networks) the conventional scheme consumes multiple hardware adjacency entries for each BGP route. The present invention hides the IGP loadsharing paths behind the internal MPLS label which is shared by all the BGP routes, so that each BGP route only needs to use one hardware adjacency entry. In a service provider or enterprise edge router where there are hundreds of thousands of BGP routes, this provides large savings in hardware resource usage. Also, less CPU processing time is required since only a limited number of IGP routes need to be updated. This provides high stability during converging time.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for forwarding packets in an MPLS network, the method comprising:
   receiving a packet at a router;
   performing a lookup in a routing table of the router to identify a VPN label and an internal label, said internal label identifying an IGP route;
   inserting the VPN label and the internal label into the packet;
   recirculating the packet with the VPN label and the internal label within the router;
   performing a lookup using the internal label;
   replacing the internal label with an IGP label; and
   transmitting the packet from the router, wherein the internal label is not provided to the router's neighbors.

2. The method of claim 1 wherein an IGP route change occurs and further comprising updating an adjacency associated with the internal label.

3. The method of claim 1 wherein the packets are recirculated prior to performing lookup using the internal label.

4. A system for forwarding packets in an MPLS network, the system comprising:
   means for receiving a packet at a router;
   means for performing a lookup in a routing table of the router to identify a VPN label and an internal label, said internal label identifying an IGP route;
   means for inserting the VPN label and the internal label into the packet;
   means for recirculating the packet with the VPN label and the internal label within the router;
   means for performing a lookup using the internal label;
   means for replacing the internal label with an IGP label; and
   means for transmitting the packet from the router, wherein the internal label is not provided to the router's neighbors.

5. The system of claim 4 wherein an IGP route change occurs and further comprising means for updating an adjacency associated with the internal label.

6. The system of claim 4 wherein the packets are recirculated prior to performing lookup using the internal label.

7. An apparatus for forwarding packets in an MPLS network, the apparatus comprising a forwarding engine configured to perform a lookup in a routing table to identify a VPN label and an internal label, insert the VPN label and the internal label into a packet, recirculate the packet with the VPN label and the internal label within the apparatus, perform a lookup using the internal label, replace the internal label with an IGP label, and transmit the packet, wherein the apparatus is located at a network device and the internal label is not provided to the network device's neighbors.

8. The apparatus of claim 7 wherein the forwarding engine is an ASIC forwarding engine.

9. The apparatus of claim 7 wherein the forwarding engine is configured to update said adjacency associated with said internal label following an IGP route change.

10. The apparatus of claim 7 wherein the packets are recirculated prior to performing lookup using the internal label.

* * * * *